United States Patent [19]

Shiba et al.

[11] Patent Number: 4,781,340

[45] Date of Patent: Nov. 1, 1988

[54] MAGNETIC TAPE CASSETTE

[75] Inventors: Haruo Shiba; Masatoshi Okamura; Makoto Saito, all of Tokyo, Japan

[73] Assignee: TDK Corporation, Tokyo, Japan

[21] Appl. No.: 589,313

[22] Filed: Mar. 14, 1984

[30] Foreign Application Priority Data

Mar. 28, 1983 [JP] Japan ............................. 58-43372[U]

[51] Int. Cl.⁴ ........................ G03B 1/04; G11B 23/08; G11B 15/32
[52] U.S. Cl. ..................................... 242/199; 360/132
[58] Field of Search ............................... 242/197–200; 360/132, 137; 352/72, 78 R

[56] References Cited

U.S. PATENT DOCUMENTS

| | | | |
|---|---|---|---|
| 3,801,042 | 4/1974 | Dobson | 242/199 |
| 3,971,071 | 7/1976 | Urayama | 360/132 |
| 4,368,860 | 1/1983 | Goto | 242/199 |
| 4,408,733 | 10/1983 | Ooishi et al. | 242/199 |

Primary Examiner—Donald Watkins
Attorney, Agent, or Firm—Oblon, Fisher, Spivak, McClelland, & Maier

[57] ABSTRACT

A magnetic tape cassette has a pair of tape reels contained in a lower casing in a rotatable manner and a leaf spring fixed to an upper casing to press down at the free end portions central projections of the tape reels, wherein the leaf spring is formed to have a substantially arcuate central portion and linear free end portions under non-loading condition, the free end portions being respectively in contact with the top of the central projection.

1 Claim, 2 Drawing Sheets

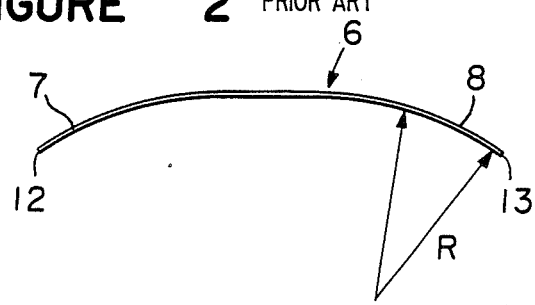
FIGURE 2 PRIOR ART
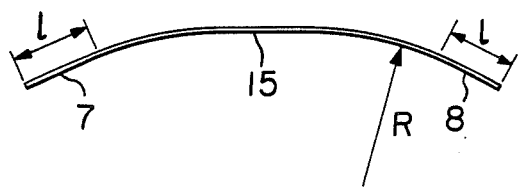
FIGURE 4
FIGURE 3
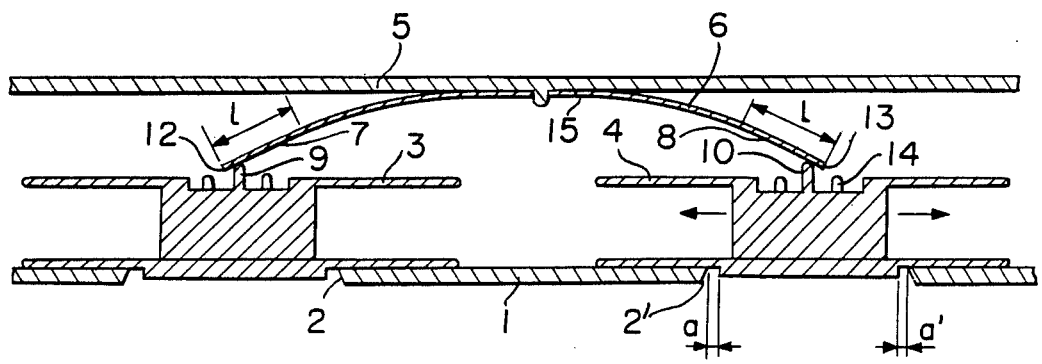

MAGNETIC TAPE CASSETTE

The present invention relates to a magnetic tape cassette. More particularly, it relates to a video tape cassette.

Various type of video tape cassetes have been proposed and practically used. For example, in a tape cassette for the VHS system, a projection extending upwardly is formed at the center of a tape reel and a free end of a leaf spring is made to contact with the projection to obtain stable running of a magnetic tape by applying an adequate pressure to the tape reel.

FIG. 1 is an exploded perspective view of a VHS type tape cassette wherein a cylindrical part formed at the lower surface of each of tape reels 3, 4 is loosely fitted into each of openings 2, 2' formed in a lower casing and projections 9, 10 formed at the center of the respective reels are pressed down by free ends 7, 8 of a leaf spring 6 fixed at the center of the inner surface of an upper casing 5. A magnetic tape protective cover 11 is pivotally attached to the upper casing 5.

In the known tape cassette, however, since the free ends 7, 8 of the leaf spring 6 are made so as to have a curvature with radius R, the distal ends 12, 13 sometimes come in contact with bosses 14 melt-bonded to the reel due to vibration during transportation, on account of which a part of the bosses may be shaved. This is because on one hand, as shown in FIG. 3 (which shows an embodiment of the present invention but is referred to for the purpose of illustration), space gaps a, a' having a dimension more than 1 mm should be respectively formed between the cylindrical part formed at the lower surface of the reel and the opening of the lower casing 1 for the purpose of automatically centering whereby the reel moves in the direction shown by the arrow marks and on the other hand, a space gap between the top of the boss and the distal end of the leaf spring is small. Thus, there is produced powder due to the shaving of the boss and the powder deposits on the surface of the magnetic tape whereby it adversely affects the video image to thereby possibly cause dropping out.

To eliminate this cause, it has been considered to shorten the length of the leaf spring 6. However, if the leaf spring is not formed so as to have a length more than a certain length, there arises difficulty in assembling work or occurs a trouble that the end portions 7, 8 of the leaf spring 5 come off from the central projections 9, 10.

Accordingly, it is an object of the present invention to provide a magnetic tape cassette equipped with a defectless leaf spring in which the length of the spring is not shortened and both end portions of the spring are made linear whereby the ends of the spring are prevented from contact with bosses of reels to thereby maintain an image quality of a magnetic tape at a high level.

The present invention provides a magnetic tape cassette in which a pair of tape reels are contained in a lower casing in a rotatable manner and a leaf spring having both free end portions is fixed to an upper casing to press down at the free end portions central projections of the tape reels, characterized in that the leaf spring is formed to have a substantially arcuate central portion and linear free end portions under non-loading condition, the free end portions being respectively in contact with the top of the central projections.

The foregoing objects, other objects as well as specific construction and operation of the magnetic tape cassette according to the present invention will be become more apparent and understandable from the following description, when read in conjunction with the accompanying drawing.

In the drawing:

FIG. 2 is a front view of a conventional leaf spring;

FIG. 3 is a cross-sectional view partly omitted of an embodiment of the tape cassette of the present invention; and FIG. 4 is a front view of the leaf spring used in the tape cassette shown in FIG. 3.

Figure 1:
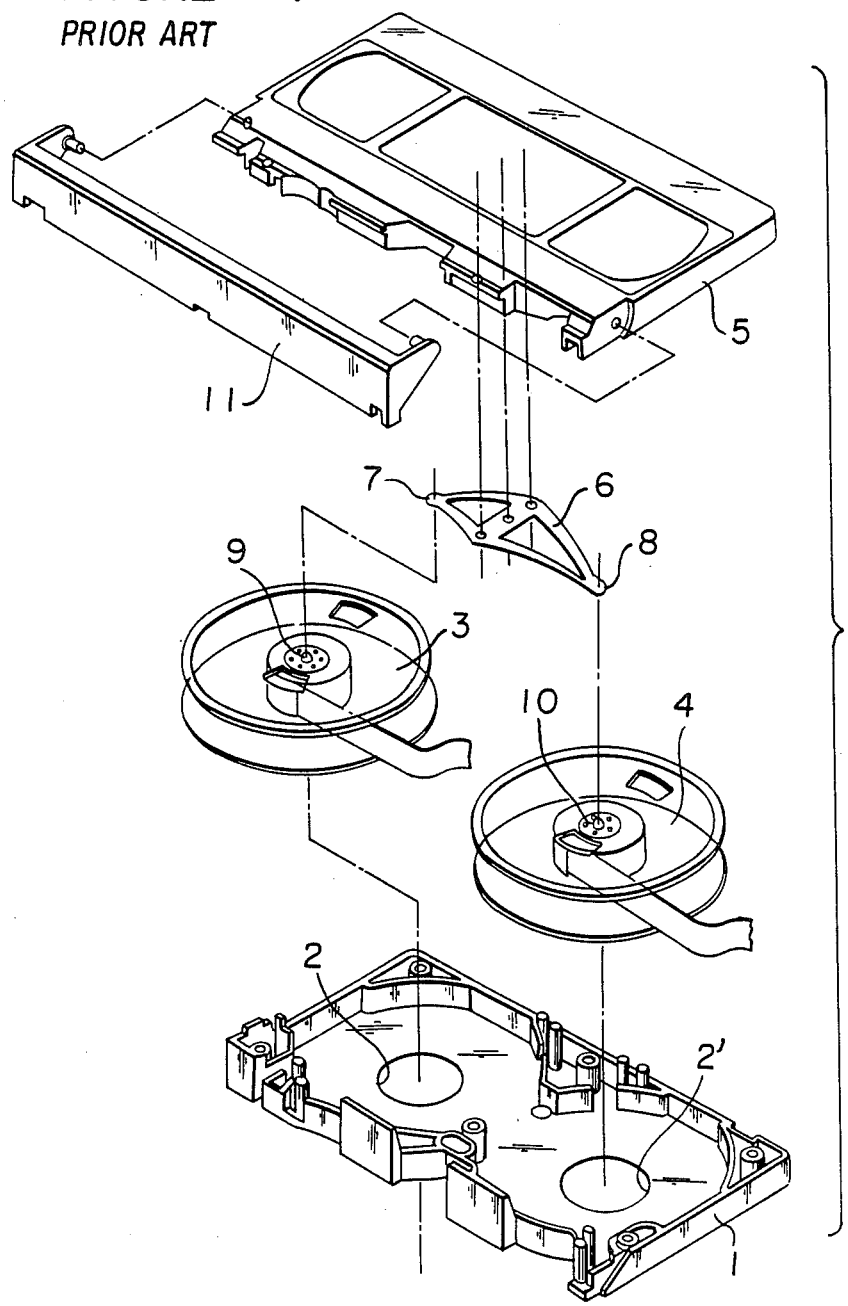
FIG. 1 is an exploded perspective view of a conventional tape cassette.

An embodiment of the present invention will be described with reference to drawing.

FIG. 3 shows a video tape cassette containing therein a leaf spring according to the present invention and FIG. 4 is a front view of the leaf spring.

The construction of the tape cassette of the present invention is same as that of the conventional one except for the structure of the leaf spring and the same reference numerals refer to the same parts as in FIG. 1 so that description concerning these parts is omitted.

The leaf spring 5 has a substantially arcuate central portion 15 and linear portions 7, 8 at its both ends. The arcuate portion 15 may have a central portion gently curved and contiguous portions, at the outer side of the curved portion, having a relatively small curvature. The free end portions 7, 8 are formed into a flat shape unlike the conventional leaf spring. The length l of the free end portions 7, 8 in the flat shape may be determined to have a suitable size dependent upon a clearance between the reel and the opening in the horizontal direction, the height of the boss from the upper surface of the reel and the distance between the reel and the upper casing. In a standard type VHS video tape cassette used at present, for example, it is preferable that the total length of the leaf spring is about 10 cm and the clearance of the reel in the horizontal direction is about 3 mm (about 1.5 mm at one side) while the length l of the linear portion is in the range from about 8 mm to about 25 mm. In other words, it is preferable that the ratio of the total length to the linear portion of the spring is about 1:0.08–0.25.

Thus, the free end portions 12, 13 of the leaf spring 6 of the present invention can be always held at a higher position than the conventional spring, on account of which there is no risk of contact of the leaf spring to the melt-bonded bosses of the reel even when an external vibration force is applied to the tape cassette during transportation and problem of powder dropping which deteriorates the quality of the magnetic tape can be eliminated.

We claim:

1. A magnetic tape cassette comprising an upper casing, a lower casing, a pair of tape reels contained in said lower casing in a rotatable manner and a leaf spring having two free ends, said leaf spring being fixed to said upper casing in a manner to press down central projections of said tape reels, wherein said leaf spring has a central portion, curved portions at both sides of said central portion, and linear free end portions at each of said free ends thereof under a nonloading condition, said free end portions being respectively in contact with the tops of said central projections, wherein the ratio of the total length of said leaf spring to the length of each said linear free end portions is about 1:0.08–0.25.

* * * * *